Nov. 29, 1932.  C. E. RORRER ET AL  1,889,499
APPARATUS AND METHOD FOR REFRIGERATION
Filed Feb. 17, 1930  2 Sheets-Sheet 1

INVENTORS
CHARLES E. RORRER
AND ALBERT R. MITTERER.
BY Rollander & Stratton
ATTORNEYS.

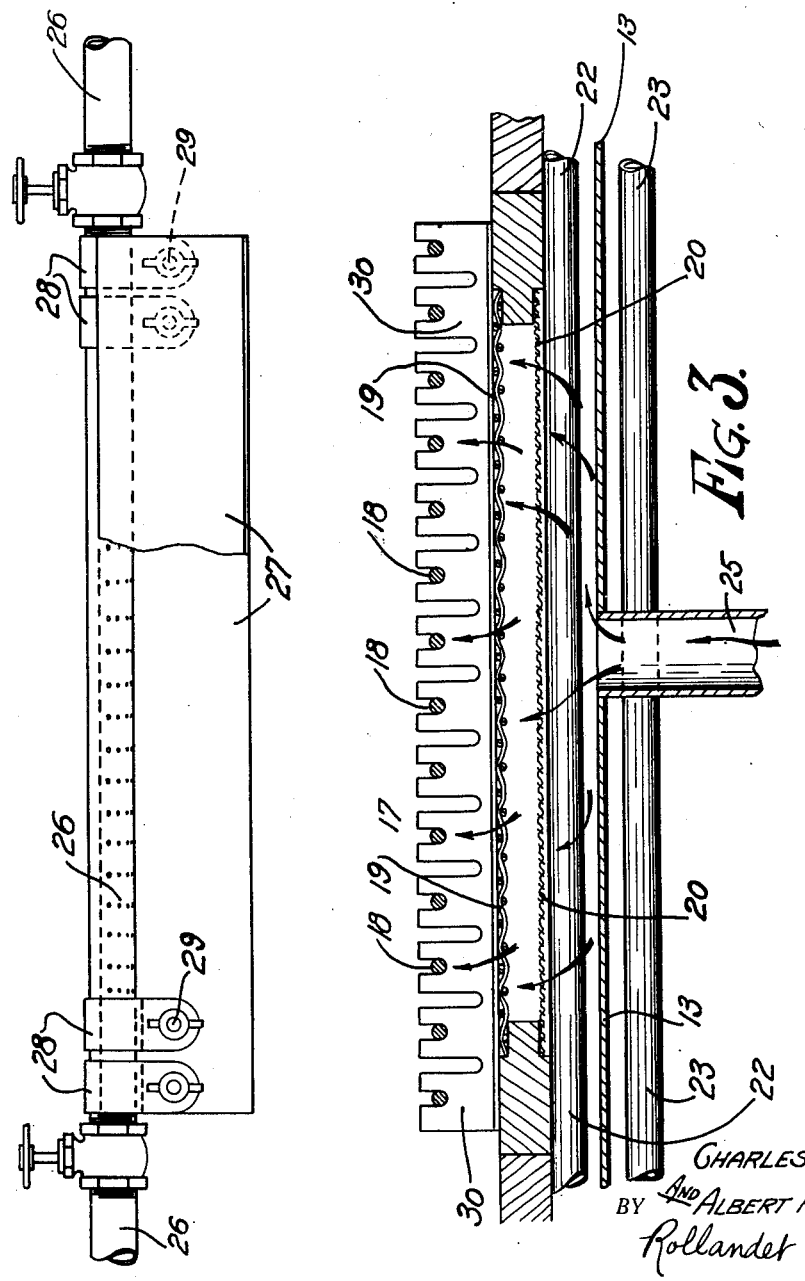

Patented Nov. 29, 1932

1,889,499

UNITED STATES PATENT OFFICE

CHARLES E. RORRER AND ALBERT R. MITTERER, OF DENVER, COLORADO

APPARATUS AND METHOD FOR REFRIGERATION

Application filed February 17, 1930. Serial No. 429,086.

This invention relates to refrigerating show cases and is a continuation in part of our application for patent Serial No. 349,965 filed March 26, 1929.

It is an object of the present invention to provide by means of a show case of novel construction, a method of preserving vegetables and other perishable merchandise by subjecting them simultaneously to refrigeration and to applied moisture.

It has been found that especially in dry and hot climates, refrigeration or moisture alone are not sufficient to preserve fresh vegetables for any length of time. In dry climates like that of the State of Colorado, applied moisture by means of a spray or other practical expedient, is an essential but the application of moisture has to be watched very carefully in order to prevent the vegetables from getting water-soaked whereby they spoil and are generally deteriorated.

When the vegetables are at the same time subjected to a cooling influence, the water does not soak in and they may be sprayed continuously.

Combined spraying and cooling keeps the vegetables crisp and fresh for an unlimited period of time; refrigeration alone will dry them out and cause them to lose their freshness and attractive appearance. The two actions must be combined to obtain the desired results.

Another object of the invention resides in the provision of simple and efficient apparatus to carry the above described method into effect.

A further object is to provide in a refrigeration case, a novel method and means for cooling vegetables or other merchandise displayed thereon.

Still other objects reside in details of construction and a novel arrangement of parts as will fully appear in the course of the following description.

Figure 1:
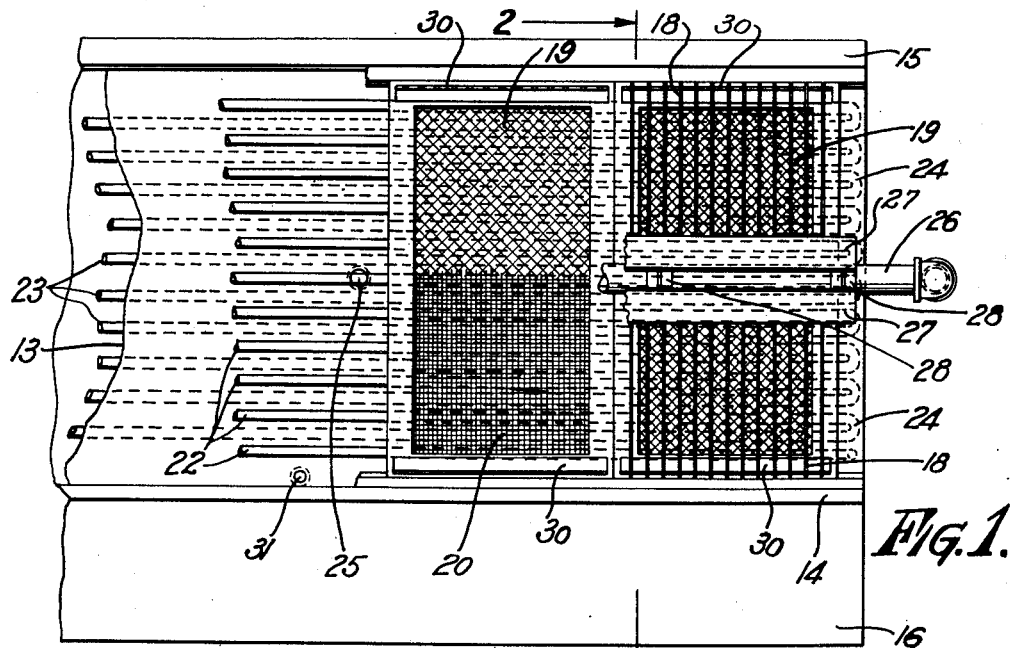

In the accompanying drawings in the several views of which like parts are similarly designated, Figure 1 represents a broken plan-view of a show case embodying the present invention.

Figure 2:
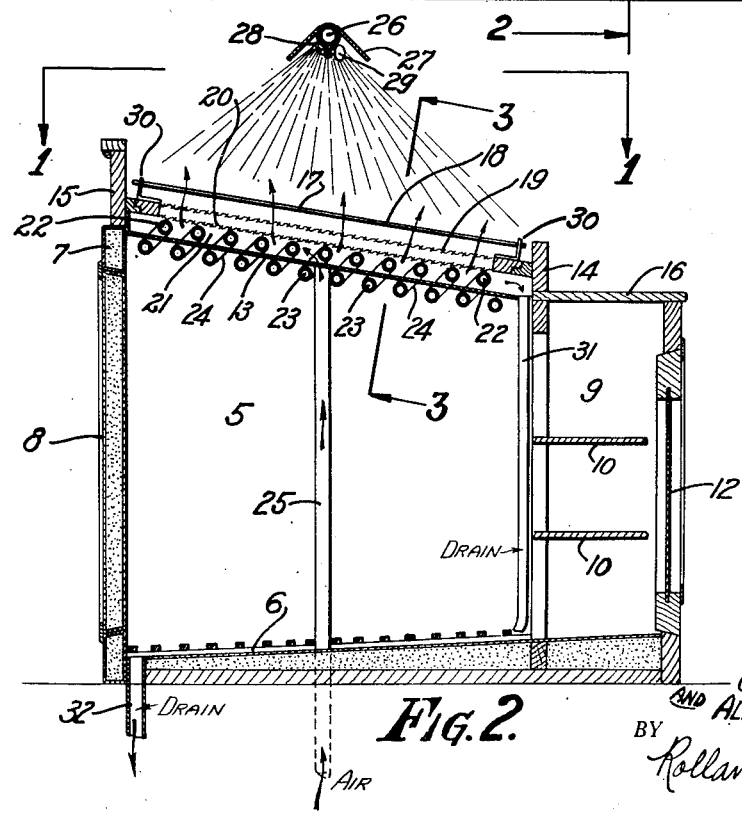

Figure 2, a section taken on the line 2—2, Figure 1, and

Figure 3, an enlarged fragmentary section on the line 3—3, Figure 2.

Referring further to the drawings, the refrigerating show case comprises a cooling chamber 5 enclosed on all sides.

The floor 6 of the chamber is insulated as shown in Figure 2. One of the walls 7 is insulated and provided with one or more insulated doors 8 and the chamber may include a compartment 9 provided with shelves 10 for the display of articles of merchandise behind windows 12. The chamber is closed at its top by a conductive plate 13 of metal or other suitable material as illustrated in Figs. 2 and 3 and above this top is an open bin for the display of vegetables and other perishable produce, defined by a front wall 14 and a rear wall 15.

The before mentioned compartment 9 has a top forward of the lower wall 14 of the bin to provide a weighing shelf 16.

The top of the case slants forwardly and in parallel relation to the top is a rack 17 composed of parallel bars 18 upon which the merchandise is supported.

The vegetables and other matter supported on the slanting rack are easily seen by purchasers at the front of the case.

Between the top of the chamber and the rack of the bin are two screens 19 and 20 for the diffusion of air through the merchandise on the rack. The screens are spaced from each other and from the plate in substantially parallel relation and in the space 21 between the screens and the plate 13 is a series of pipes 22 connected with a suitable refrigeration system or apparatus not shown in the drawings.

A similar series of pipes 23 extends within the chamber immediately beneath the top-plate and the two series are connected by elbows 24 to form a continuous conduit through which the cooling fluid passes.

It will be seen that in this manner the interior of the case and the vegetable bin may be simultaneously cooled by connection with the refrigeration system. A pipe 25 that may extend through the chamber, has an outlet in the plate for the introduction of air into the space 21 of the bin beneath the screens.

The pipe is connected with a conveniently located source of air under pressure and its object is to drive a current of cooled air upwardly through the vegetables or other perishable merchandise supported on the rack. The flow of the air discharged from the pipe into the space 21 is retarded by its contact with the screens the lower one of which is for that purpose made of smaller mesh than the upper one.

The retained air is cooled by its contact with the pipes 22 and is spread throughout the space to be subsequently diffused through the screens and through the merchandise supported on the rack. In this connection it is to be understood that if so desired the rods of which the rack is composed, may be removed and the merchandise supported immediately upon the upper screen.

The currents of cold air passing through the merchandise on the rack, drives the warmer outside air away from the merchandise and maintains the merchandise constantly at the low temperature required for its preservation. At the same time the vegetal merchandise thus cooled, is moistened by sprays of water emitted through a perforated pipe 26 above the bin. The pipe is connected with a convenient source of water under pressure and a deflector 27 directs the water onto the contents of the bin. The deflector is supported on the perforated pipe by suitable clamps 28 including clamping screws 29 which may be loosened to adjust the position of the deflector on the pipe. By this means the water may be directed to any selected part of the bin.

The elevation of the rack above the screens may be varied by the simple expedient of supporting the ends of the rods on cross bars 30 having slots of different depths as shown in Figure 3. When the rods are laid in the deepest slots the rack is close to the screens while when placed in the more shallow slots they are farther removed from the screens. Thus the bin may be adapted for the preservation of vegetal merchandise of different kinds.

As stated before, it is preferred to make the lower one of the two screens of finer mesh than the upper one, whereby the air currents are spread and retarded to be thoroughly cooled and diffused for their passage through the upper screen.

A drain pipe 31 opening in the top plate, is for the discharge of liquid from the bin into the bottom of the chamber and a pipe 32 drains the liquid from the chamber. The floor of the chamber may be slanted to assist the flow of water to the drain pipe.

It is to be understood that by this method of draining, the contents of the chamber likewise obtains the benefit of the moisture applied to the contents of the bin.

We claim:

1. A show case having a closed merchandise chamber and an open bin above the same, and means to circulate a cooling medium through a closed section about opposite sides of the wall between the chamber and the bin for their simultaneous refrigeration.

2. A show case having a closed merchandise chamber and an open bin above the same, and cooling means including a conduit composed of connected series of pipes, certain of which are located in said chamber and others of which are located adjacent the bottom of said bin.

3. In a show case, an open bin having a support for merchandise, said support being apertured for a circulation of air currents upwardly through said support and merchandise and cooling means in the path of such air currents beneath the support.

4. In a show case, an open bin, a rack in the bin for the support of merchandise, said support being apertured for circulation of air currents through said support and merchandise, and cooling means in the path of such air currents beneath the rack, the rack being adjustable to vary its distance above the cooling means.

5. In a show case, an open bin, and an open rack in the bin for the support of merchandise, composed of slotted cross bars, and rods resting in the slots of the cross bars, and cooling means adjacent said rack.

6. In a show case, an open bin, and an open rack in the bin for the support of merchandise, composed of cross bars having slots of different depths, and rods resting in slots of the bars, and cooling means adjacent said rack.

7. In a show case, a bin having an open support for merchandise, cooling means beneath the support, means to cause a current of air to move past the cooling means and through the support for the refrigeration of merchandise on the support, and means for the retardation and diffusion of the air current, between the cooling means and the support.

8. In a show case, a bin having a bottom, a screen spaced from the bottom, cooling means in the space between the bottom and the screen, and means for the introduction of air under pressure into the space.

9. In a show case, a bin having a bottom, a screen spaced from the bottom, a second screen of larger mesh spaced above the other screen, cooling means in the space between the lower screen and the bottom, and means for the introduction of air under pressure into said space.

10. In a show case, a bin having a bottom, a screen spaced from the bottom, a second screen spaced above the other screen, cooling means in the space between the lower screen and the bottom, and means for the introduction of air under pressure into said space.

11. A refrigerating case having a cooling chamber for merchandise, means to cool said chamber, an open display bin above the chamber, and a compartment in connection with the chamber, the compartment having a top forward of the display bin to provide a weighing-shelf.

12. In a show case, a bin having an open support for merchandise, a refrigerating element beneath the support, and a spraying element above the same.

13. In a show case, a bin having an open support for merchandise, a refrigerating element beneath the support, means to apply moisture to the bin from above the same, and means to effect a movement of air currents past the refrigerating element and through the support.

14. In a show case, a bin having an open support for merchandise, a refrigerating element beneath the support, a spraying element above the same, and adjustable means for the deflection of the spray to any selected part of the support.

15. A show case having a cooling chamber and a bin above the same, means to refrigerate the chamber and the bin, means for the application of moisture to the bin from above the same, and means for draining liquid from the bin.

16. A show case having a cooling chamber and a bin above the same, means to refrigerate the chamber and the bin, means for the application of moisture to the bin from above the same, means for draining liquid from the bin into the chamber, and means for draining moisture from the chamber.

17. The method of preserving perishable merchandise consisting in subjecting the merchandise simultaneously to the influences of independently applied artificial refrigeration and moisture.

18. The method of preserving perishable merchandise consisting in independent and simultaneous application of artificial refrigeration from beneath the merchandise and moisture from above the same.

19. The method of preserving perishable merchandise consisting in subjecting the merchandise to the influence of artificially refrigerated currents of air under pressure, for refrigerating purposes, simultaneously with and independently of the application of moisture to the merchandise.

20. The method of preserving perishable merchandise consisting in passing refrigerated air under pressure, for refrigerating purposes, through the merchandise simultaneously with and independently of the application of moisture to the merchandise.

21. In a show case, an open top for the reception of merchandise, and cooling means beneath the base of said top, so spaced relative thereto as to cool merchandise contained therein, and means to support the merchandise in said open top, and out of actual contact with said base and cooling means.

22. In a show case, an open top for the reception of merchandise, a foraminous support for the merchandise in said top, and cooling means beneath the base of said top and the support and effective to cool the merchandise from beneath, through the apertures of said support.

23. In a show case, an open top for the reception of merchandise, a foraminous support for the merchandise in said top, and cooling means beneath the base of said top and the support and effective to cool the merchandise from beneath, through the apertures of said support, and means to vary the position of said foraminous support relative to said cooling means.

24. In a show case, an open bin having a support for merchandise, said support being apertured for circulation of air currents through said support and merchandise, cooling means in the path of such air currents, and means to cause a circulation of air past the cooling means and upwardly through the apertures of said support.

25. In a show case, an open bin having a support for merchandise, a cooling means adjacent said support, and means to conduct air currents past the cooling means, upwardly to the merchandise on the support.

In testimony whereof we have affixed our signatures.

CHARLES E. RORRER.
ALBERT R. MITTERER.